United States Patent [19]

Pirotta et al.

[11] 4,404,346
[45] Sep. 13, 1983

[54] PRODUCTION OF POWDERED RESIN AND THE POWDERED RESIN SO PRODUCED

[75] Inventors: Marico G. Pirotta; Giberto Garbagnati, both of Milan, Italy

[73] Assignee: Rohm and Haas Company, Philadelphia, Pa.

[21] Appl. No.: 176,732

[22] Filed: Aug. 5, 1980

[51] Int. Cl.³ .................. B01J 41/08; A31K 31/74
[52] U.S. Cl. ................................... 521/29; 521/25; 424/79; 528/499; 528/502
[58] Field of Search .................. 521/25, 29; 424/79

[56] References Cited

U.S. PATENT DOCUMENTS

| 2,581,035 | 6/1952 | Martin et al. | 424/79 |
| 2,677,670 | 5/1954 | Kienin et al. | 424/79 |
| 3,980,770 | 9/1976 | Ingelmann et al. | 427/79 |

OTHER PUBLICATIONS

H. G. Tanner, Chem. and Ind. Chem., 1957, vol. 49, pp. 170–173.
Schultz et al., I and EC Product, Res. and Devel., vol. 7, No. 2, Jun., pp. 120–125.

Primary Examiner—Joseph L. Schofer
Assistant Examiner—Peter F. Kulkosky

[57] ABSTRACT

Powdered synthetic polymeric resin is produced by swelling or shrinking resin particles by contact with water or an organic solvent to introduce strain within the particles and comminuting the swollen or shrunk particles by grinding them in a rotary attrition mill. This process is particularly useful for the production of powdered resins for oral consumption, for example powdered cholestyramine resin, since particle sizes such that 90% by weight and/or number is below 30 microns in average particle diameter in the wet swollen state may be achieved.

10 Claims, No Drawings

PRODUCTION OF POWDERED RESIN AND THE POWDERED RESIN SO PRODUCED

This invention is concerned with the production of powdered resin, particularly from synthetic polymeric adsorbent or ion exchange resin beads, and the powdered resin so produced.

It is known, for example from Schultz and Crook, Ind. and Eng. Chem. Product Research and Development, Vol. 7, No. 2, June 1968 pages 120 to 125 to be advantageous for some uses that a synthetic polymeric adsorbent or ion exchange resin have a particle size of up to 44 microns average particle diameter. In that disclosure there are demonstrated so-called ultrafine resins, 0.5 to 1.5 microns particle diameter, and so-called micropowder resins, particle diameter 25 to 44 microns are also mentioned. It is also disclosed that when the resins are for oral consumption the higher particle sizes are less attractive as they impart unpleasant grittiness in the mouth and tend to form non-stable, settling aqueous dispersions.

Ion exchange and adsorbent resin beads produced by conventional suspension polymerization processes generally have a particle size around 600 microns. Many attempts have been made to reduce this particle size by pulverising such beads. For example resin beads have been dried, removing entrapped water deriving from the aqueous suspension polymerization medium, and impacted by air pressure against a grid. Alternatively undried resin has been milled, dried and milled again. Such processes, however, all have disadvantages. For example in some cases it has been found that no matter how many passes the resin makes through the grinding mill the particle size cannot be reduced to a sufficiently low level. For effective size reduction in some mills the resin must be dried to avoid the lubricating effect of moisture. This is why, in the prior art process described above, the second grinding cycle is carried out on dried resin. However, this often has the disadvantage that the temperature in the mill rises, sometimes to such an extent that the resin may begin to degrade.

We have now found a process wherein beads of synthetic polymeric resin may be efficiently and effectively comminuted without excessive temperature increase to such a low particle size that they form stable dispersions and to not have a gritty taste in the mouth.

This invention comprises a process for the comminution of particles of synthetic polymeric resin wherein the resin particles are swollen or shrunk by contact with water or an organic solvent to introduce strain within the resin particle and are subsequently ground in a rotary attrition mill. There is thus provided, according to one aspect of the invention, a process for the comminution of beads of synthetic polymeric resin which comprises swelling or shrinking the beads, which have optionally been subjected to prefragmentation without drying, by contacting them for at least 0.5 minutes, and in the case of cholestyramine preferably at least 5 minutes, with water or an organic solvent adjusting, if necessary, the ratio of liquid to resin to at least 0.3:1, preferably at least 1:1 by weight and grinding the resulting slurry in a rotary attrition mill.

The rotary attrition mills suitable for use in the process of the invention are those mills which can be regarded as modern counterparts of the early bulkstone mill. Stones in the early mills are replaced by discs or cones or cylinders of metal or abrasive grinding material which rotate relative to each other. Grinding takes place between the cones, cylinders or plates in a horizontal or vertical plane. The grinding surfaces are generally shaped to come closer together along the path through which the material being ground passes. The space between the grinding surfaces is, however, adjustable and, without adjustment, does not vary during grinding. The grinding surfaces may carry projections such as teeth or spikes to aid in the grinding operation particularly at the coarser levels of grinding.

Thus in the preferred rotary attrition mills useful in the invention the resin particles are sheared and cut by passage through a predetermined grinding gap between relatively rotating surfaces.

As mentioned, the resin beads may be prefragmented before being subjected to the swelling/shrinking treatment. Additionally, after the swelling/shrinking step, the first stage of the comminution of the beads, chips or prefragmented beads, (collectively called particles) may be carried out in a mill other than a rotary attrition mill, for example a ball mill.

The processes of this invention may be used to produce a ground resin which, when in the wet swollen state, has 90% by weight and/or number below 30 microns, preferably all below 30 microns, most preferably 90% by weight and/or number below 10 microns, in average particle diameter. When dry such a resin will have 90% by weight and/or number below 15 microns most preferably 90% by weight and/or number below 5 microns in average particle diameter. Measurement of particle size is by Coulter Counter technique using an isotonic solution.

The process is particularly suitable for comminuting nitrogen-containing polymers which have, inter alia, bile-acid fixing and triglyceride fixing ability. Such polymers are disclosed in U.K. Patent Specifications Nos. 929,391, 1,286,949 and 1,446,352, corresponding to U.S. Patent Application, Ser. No. 748,598, filed July 15, 1958, and U.S. Pat. Nos. 3,780,171 and 3,974,272, respectively. Such materials, commercially are generally strongly basic styrenedivinylbenzene aminated ion exchange resins in the chloride form. They may be gel or macroreticular resins but are generally gel. These so-called cholestyramine resins usually have a bead or chip size above 325 U.S. Standard Sieve series. Useful cholestyramine bead or chip resins are described in British Pat. No. 929,391, corresponding to U.S. Patent Application, Ser. No. 748,598, filed July 15, 1958. The minimum properties of such resins, e.g. glycocholate capacity, are specified in the U.S. Pharmacopeia.

As indicated above, we believe that when resin particles, before comminution, are treated as indicated with water or organic solvent shrinking or swelling of the resin results to cause strain within the resin particle which significantly aids in the grinding step. Thus, although the resin beads may be fragmented before this swelling or shrinking step they should not be so small that such internal strain will not be caused. A minimum particle size for the, optionally prefragmented, resin beads used as starting material in the process of the invention is preferably 10 microns, most preferably 50 microns.

The contact time with the water or organic solvent should preferably be at least sufficient to cause the beads to shrink to 95% or swell to 105% of their dry size, preferably swell to 10 times dry size. This will not usually be achieved in less than 0.5 minutes. A preferred contact time is at least about 15 minutes, most preferably 30 to 90, usually about 60, minutes.

In a preferred process of the invention the resin particles are treated, during the shrinking/swelling step, with a material in the water or organic solvent medium, which will induce osmotic shock and so increase the strain in the resin particle. An example of a suitable solute is sugar when the contact medium is aqueous. Other candidate solutes are sodium chloride or inorganic acids such as hydrochloric or basis such as sodium hydroxide or organic salts, alcohols, glycols, carbonyl compounds for aqueous media and mineral oils, hydrocarbons, chlorinated hydrocarbons, alcohols, glycols, carbonyl compounds for organic media although any solute which will not react with the resin and, preferably, has a high molecular weight would be suitable. These solutes are preferably present in the contact medium at concentrations of 5 to 50% by weight.

When the ground resin is to be used for pharmaceutical applications it is important to choose grinding surfaces which will not shed undesirable materials into the ground resin. We have found that corundum surfaces are acceptable in this respect. In one suitable mill employing corundum stones, the product to be treated is passed through a grinding gap between two horizontally or vertically mounted grinding stones, one of which rotates and the other of which is stationary. The resin particles are thus subjected to crushing on their way from the inlet at the centre of the stones to the outlet at the periphery, at numerous shearing points. The grinding gap between the stones is adjustable, preferably even during operation and preferably by such precise amounts as 5 microns. Suitable mills are preferably provided with grinding element cooling capability.

The grinding step is preferably carried out with a grinding gap of 0.001 to 0.01 mm, preferably about 0.005 mm, at a pressure of 2 to 40 Kg/cm$^2$, preferably about 5 Kg/cm$^2$ and a relative speed between the grinding surfaces of 2,000 to 25,000 R.P.M., preferably about 5,800 R.P.M.

As stated above this information is particularly suitable for the production of ground cholestyramine resin. Other resins which can be efficiently ground by this process include most of the synthetic resins, particularly ion exchange resins, polymeric adsorbents, carbonaceous adsorbents and some activated carbons. Among ion exchange resins and polymeric adsorbents, particularly suitable are those based on styrenedivinylbenzene resin beads which, when ground, may be useful in the fields of diagnostic, dietetic, pharmaceutical, alimentary, agricultural, veterinary and water treatment.

This invention will now be described, for the purposes of illustration only, in the following Example.

EXAMPLE 1

To 10 kg cholestyramine wet beads;
average particle size 600 microns, moisture 75%
exchange capacity=4.2 meq/gr dry (Cl$^-$) spec. gravity 0.688; were added 40 Kg deionized sterile water. The mixture was agitated for 5 minutes, left to stand for 60 minutes, stirred again and fed to a mill using a high pressure slurry pump. The mill used was a corundum stone mill, operated under the following conditions:
Gap=0.001 mm
Pressure/pump=18.7 kg/cm$^2$
Speed=19,300 R.P.M.
Discs grain coarses=180
Cooling mixture inlet temperature −5° C.; outlet average temperature 20° C.
Motor 380 V—3 phase current—50 Hz fire proof—80 HP The slurry was passed through the mill only once over a period of 36 minutes and at an inlet slurry temperature of 20° C. and an outlet slurry temperature of 27° C.

The ground product obtained, after drying, had the following analysis:
Granulometry(by number):
100% less than 15 microns,
88% less than 10 microns,
48% less than 6 microns,
22% less than 3 microns;
Capacity:
Cl$^-$=4.2 meq/gr dry resin (USP=4 to 4.86 i.e. 14 to 17% chloride)
Glycocholate=2.2 gr/gr dry resin (USP=1.8 to 2.2)
Other characteristics:
Dializable quaternary ammonium salts=0.01% as benzyltrimethylammonium chloride
(USP spec 0.05% maximum)
Residue on ignition: 0.02% (USP 0.1%);
pH 5.3 (USP 4 to 6) in a slurry;
Heavy metals: 0.0015% (USP 0.0020%);
Loss on drying 8% (USP 5 to 12%);

| Colour: | white; | Solubility: | insoluble |
|---|---|---|---|
| Odour: | odourless; | | in H$_2$O alcohol, |
| Taste: | tasteless; | | benzene, CHCl$_3$ and ether. |

COMPARATIVE EXAMPLE

In this example another portion of the cholestyramine wet beads used in Example 1 was ground by conventional methods to pass through 200 US mesh. A comparison of the properties of this prior art resin with that of Example 1 is given in Table I.

TABLE I

| | Prior Art Resin | Example 1 Resin |
|---|---|---|
| Colour | Buff-coloured | White |
| Odour | Slight amine like | Odourless |
| Taste | Gritty | Tasteless |
| Capacity Cl | 14.00% | 14.7% |
| Capacity glycocholate (gr/gr dry resin) | 1.83 | 2.20 |
| Dializable quat salts | 0.048% | 0.010% |
| Residue on ignition | 0.02% | 0.02% |
| Heavy metals | 0.0015% | 0.0015% |
| pH | 5.5 | 5.3 |
| Loss on drying | 10.5% | 8% |

It will be apparent from this Table that the resin of Example 1 has not undergone the increase in dializable quaternary salts that would have been expected in reducing it to the smaller particle size, and furthermore that it has a higher glycocholate capacity than the standard resin.

Thus this invention makes it possible to produce cholestyramine resin of the particle size hereinbefore defined and having a content of dializable quaternary salts (as benzyltrimethylammonium chloride) less than 0.035%, preferably less than 0.025%. This is the result of the particle size reduction being carried out under conditions in which the resin does not become heated to the point of substantial degradation.

Another aspect of this invention therefore comprises cholestyramine resin, usually crosslinked styrene quaternary ammonium salt resin in the form of a non-toxic salt, such as chloride, sulphate, acetate or phosphate or in the free base form, having a particle size in the swollen state in which 90% by weight is below 30 microns, having a glycocholate capacity at least equal to the minimum specified in the U.S. Pharmacopeia and a maximum content of dializable quaternary ammonium salts, expressed as benzyltrimethylammonium chloride, of 0.035% by weight.

The maximum dializable quaternary ammonium salt content of the cholestyramine resins of this invention is below the maximum of 0.05% specified in the U.S. Pharmacopeia, and the other characteristics of the product at least conform to, and in most cases exceed, the U.S. Pharmacopeia minimum. This is evident from the Example above which also demonstrates the improved palatability of the cholestyramine resin of the invention.

The resins of the invention can be made into conventional pharmaceutical formulations such as tablets, ointments, creams, elixirs, syrups, emulsions, aqueous solutions or suspensions with added flavouring, or suspensions in organic diluents such as corn oil or mineral oil. The unit dosage is of convenient size such as tablets containing from 100 mg to 1 gram of the resin or suspensions containing from 100 mg to 1 gr of resin per 5 c.c. Examples of suitable formulations are given in British Pat. No. 929,391, corresponding to U.S. Patent Application, Ser. No. 748,598, filed July 15, 1958.

This invention also extends to such pharmaceutical formulations containing resin of the invention.

EXAMPLE 2

40 kg of deionised sterile water were added to 200 kg of wet cholestyramine beads having an average particle size of 600 microns, a moisture content of 76%, an exchange capacity of 4.3 meq/gr dry $Cl^-$, and a specific gravity of 0.688 gr/liter. The slurry was agitated for 5 minutes and left to stand for 20 minutes.

The slurry was kept under agitation and fed to a mill using a pressure slurry pump.

The mill used was a corundum stone mill operated under the following conditions:

| | |
|---|---|
| Gap: | 0.000 |
| Pressure: | 4 kg/cm$^2$ |
| Speed: | 3000 RPM |
| Grain of discs: (Rotor-Stator) | 80–60 |
| Temperature: | about 20° C. inlet about 70° C. outlet |
| Motor: | As in Example 1 |

The slurry was passed through the mill once only over a period of 60 minutes. The ground product obtained had the following analysis (wet) using Coulter

| Counter equipment with: | |
|---|---|
| Aperture resistence: | 2–10K$\Omega$ |
| Aperture diameter: | 280 mm Serial No. 25287 |
| Analysis (by number): | 90% less than 15 microns |
| | 65% less than 10 microns |
| | 20% less than 6 microns |

We claim:
1. A process for comminuting particles of cholestyramine resins comprising the steps of
   (a) inducing strain into the particles by changing their dimensions through contact with water or an organic solvent, and
   (b) subsequently grinding the particles in a rotary attrition mill until the size of the particles is reduced such that at least 90% by weight and/or number of the particles are below 30 microns in diameter.
2. The process according to claim 1 wherein the particles are sheared and cut in the rotary attrition mill by passing them through a predetermined grinding gap between relative rotating surfaces.
3. The process according to claim 1 wherein the particles are resin beads or fragmented resin beads.
4. The process according to claim 1 wherein, subsequent to the strain-inducing step, the particles are comminuted in another type of mill prior to being ground in the rotary attrition mill.
5. The process according to claim 1 wherein the time of contact with water or organic solvent for the purpose of inducing strain is at least 0.5 minutes.
6. The process according to claim 1 wherein the particles are ground in the rotary attrition mill as a slurry, and the ratio of liquid to resin in the slurry is at least 0.3:1.
7. The process according to claim 5 wherein the time of contact with water or organic solvent is at least sufficient to cause a dimension change of at least ±5% of the dry particle diameter.
8. The process according to claim 1 wherein, following the induction of strain, the particles have a minimum particle diameter of 10 microns.
9. The process according to claim 2 wherein the grinding gap of the rotary attrition mill is from about 0.001 to about 0.01 mm, the pressure is from about 2 to about 40 kg/cm$^2$, and the relative speed between the grinding surfaces is from about 2,000 to about 25,000 r.p.m.
10. The process according to claim 1 wherein the time of contact with the water or organic solvent for the purpose of inducing strain is at least 5 minutes.

* * * * *